No. 787,654. PATENTED APR. 18, 1905.
C. H. ALLMOND.
LUBRICATOR.
APPLICATION FILED JUNE 13, 1904.
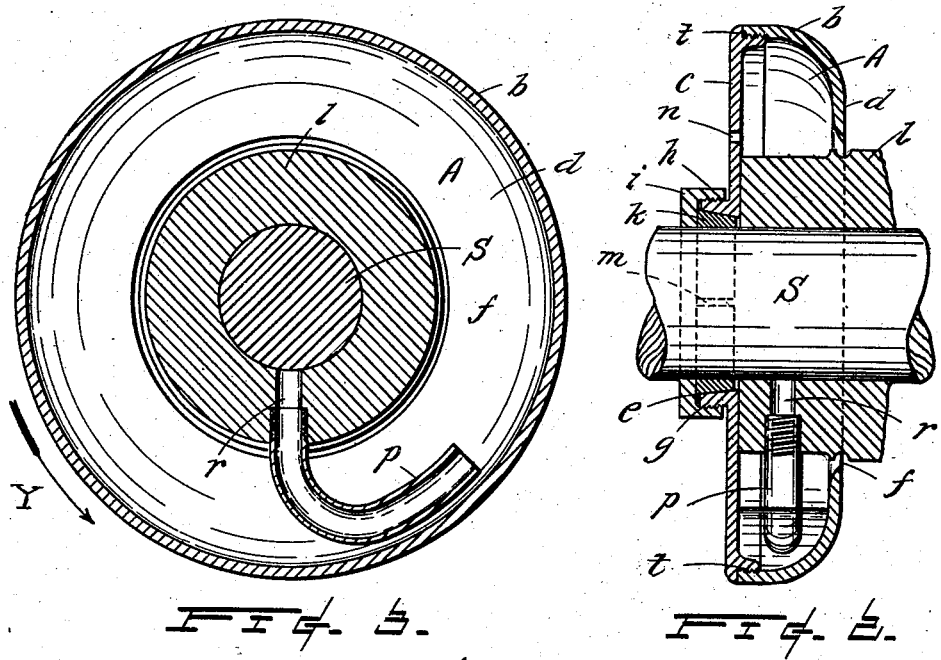
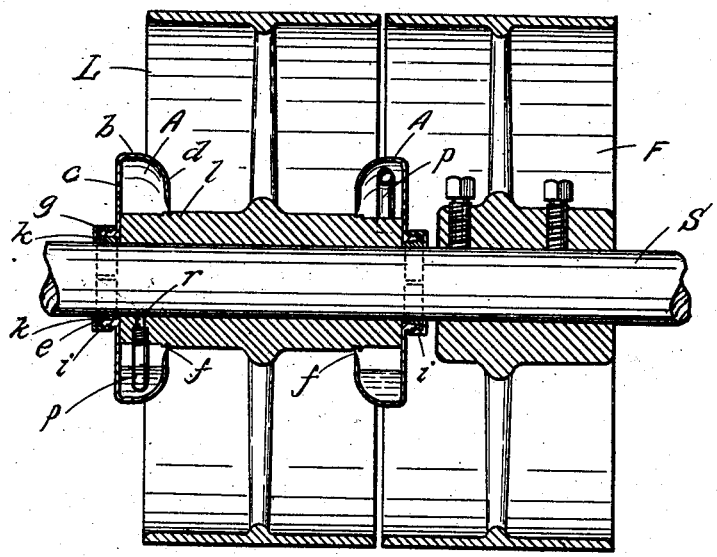
WITNESSES:
INVENTOR.
C. H. Allmond
BY
ATTORNEY.

No. 787,654.

Patented April 18, 1905.

UNITED STATES PATENT OFFICE.

CHARLES H. ALLMOND, OF SEATTLE, WASHINGTON.

LUBRICATOR.

SPECIFICATION forming part of Letters Patent No. 787,654, dated April 18, 1905.

Application filed June 13, 1904. Serial No. 212,246.

*To all whom it may concern:*

Be it known that I, CHARLES H. ALLMOND, a citizen of the United States, residing at Seattle, in the county of King and State of Washington, have invented certain new and useful Improvements in Lubricators, of which the following is a specification, reference being had therein to the accompanying drawings.

The object of my invention is to provide, for use with wheels or pulleys which are rotatable independently of the shaft upon which mounted, an improved lubricator whereby oil is supplied to the journal in sufficient quantities to thoroughly lubricate the same and yet prevent all loss of oil either by dripping or from being thrown off by centrifugal force.

In carrying out my invention I provide for each end of the journal to be lubricated a chambered set-collar of greater diameter than and projecting over the end of the pulley-hub. These set-collars prevent the longitudinal displacement of the pulley, and the interior annular spaces about the periphery of each hub forms a reservoir for the reception of the lubricant, which is conveyed to the journal when the pulley is in motion by special devices carried by the hub of the latter, all as hereinafter set forth.

In the said drawings, showing the preferred construction of the invention, Figure 1 is a longitudinal view of a portion of a shaft upon which is mounted fixed and loose pulleys and my improved lubricator shown in section. Figs. 2 and 3 are enlarged detail longitudinal and cross-sectional views of the same.

S represents a shaft having mounted thereon a fixed pulley F and a loose pulley L, as is ordinary.

A is an oil-receptacle which is of greater diameter than the pulley-hub 1, to which it is applied, and is provided with a peripheral wall $b$ and end walls $c$ and $d$. The end walls are respectively provided with central or axially-disposed apertures $e$ and $f$ of somewhat greater diameters than that of the shaft and of the hub, as shown. The aperture $e$ is made conical, and in order to extend the length of the same a collar $g$ is projected outwardly from the wall and is provided upon its external circumferential surface $h$ with screw-threads corresponding to internal screw-threads of a cap-piece $i$.

$k$ is a sleeve having an internal bore of approximately the same diameter as said shaft, and its external circular surface is made conical with a taper corresponding to that of the aperture $e$. It is likewise provided with a longitudinal slot $m$, whereby the sleeve when forced into said aperture by the screwing on of the cap is capable of closing upon to rigidly embrace the shaft and secure the receptacle in place. Oil is supplied to the receptacle through charging-hole $n$, provided in the wall $c$. The oil is conducted to the journal by a curved or bent pipe $p$, secured to the pulley-hub 1 and the radial passage-way $r$ of the latter. This pipe terminates in proximity to the inner peripheral surface of the oil-receptacle, and its mouth is pointed (when applied with a driven shaft) in the direction of the pulley rotation, as indicated by arrow Y in Fig. 3, so that when the pipe revolves it scoops up the oil from the bottom of the receptacle and delivers it to the journal. When, however, the device is used on a driving-shaft, then the journal should be lubricated when the shaft is running and the pulley idle, which would require the scoop-pipe to be turned in the reverse direction to that indicated by the aforesaid arrow.

For convenience in assembling the parts the oil-receptacle is preferably made in two parts, as shown in Fig. 2, wherein they are shown as being screwed together, as at $t$.

When the device is in rotation, the oil is kept close to the outer periphery of the chamber by centrifugal force, so that none can escape through the annular opening about the hub, and when the device is quiescent and the pulley rotates then the oil is collected in a body at the bottom of the chamber and within the path of the mouth of the revolving pipe $p$.

Changes may obviously be made in the details of construction shown without departing from the invention or sacrificing its advantages. For example, the oil-receptacle may be secured to the shaft by a set-screw and the lubricant raised a groove in the hub by the well-known endless chain.

Having described my invention, what I claim as new, and desire to secure by Letters Patent, is—

1. The combination with a shaft and a loose pulley, of a lubricator of the class described, comprising an oil-receptacle provided with a longitudinally-projecting collar having an axial conical bore, a tapering sleeve registering with said bore, a cap adapted to be screwed upon the said collar, and a bent pipe secured to the hub of said pulley interiorly of the oil-receptacle.

2. A lubricator of the class described comprising a shaft and a loose pulley, an oil-receptacle provided with a longitudinally-projecting collar having an axial bore, a tapering sleeve registering with said bore, a cap adapted to be secured upon the said collar, there being a passage-way through the hub of the pulley and connecting the interior of the casing with the bearing-surface of the shaft and means for conveying the oil from the receptacle to the passage-way.

In testimony whereof I affix my signature in presence of two witnesses.

CHARLES H. ALLMOND.

Witnesses:
 PIERRE BARNES,
 HENRY S. NOON.